United States Patent
Dürr et al.

[11] Patent Number: 4,793,237
[45] Date of Patent: Dec. 27, 1988

[54] SERVO CONTROL SYSTEM, PARTICULARLY A POWER CONTROL SYSTEM FOR MOTOR VEHICLES

[75] Inventors: Eugen Dürr, Aichwald; Günter Wörner, Kernen, both of Fed. Rep. of Germany

[73] Assignee: Daimler-Benz Aktiengesellschaft, Stuttgart, Fed. Rep. of Germany

[21] Appl. No.: 66,303

[22] Filed: Jun. 25, 1987

[30] Foreign Application Priority Data

Jun. 25, 1986 [DE] Fed. Rep. of Germany ....... 3621294

[51] Int. Cl.⁴ .............................................. F15B 9/10
[52] U.S. Cl. ......................................... 91/380; 91/382
[58] Field of Search ..................... 91/368, 380, 382; 74/388 PS; 180/132

[56] References Cited

U.S. PATENT DOCUMENTS

| | | | |
|---|---|---|---|
| 2,769,348 | 11/1956 | Hammond | 91/382 X |
| 2,782,652 | 2/1957 | Fletcher | 91/382 X |
| 2,929,364 | 3/1960 | Gribler | 91/382 X |
| 2,930,359 | 3/1960 | MacDuff | 91/368 |
| 2,964,017 | 12/1960 | Hruska | 91/368 |
| 3,023,827 | 3/1962 | Sheler | 91/368 X |
| 3,292,499 | 12/1966 | Duffy | 91/368 |
| 3,457,836 | 7/1969 | Henderson | 91/380 |
| 3,733,967 | 5/1973 | Duffy | 91/382 X |
| 4,669,360 | 6/1987 | Yanai et al. | 91/382 |

FOREIGN PATENT DOCUMENTS 1093224 11/1960 Fed. Rep. of Germany .
1166636 3/1964 Fed. Rep. of Germany .

Primary Examiner—Robert E. Garrett
Assistant Examiner—M. A. Williamson
Attorney, Agent, or Firm—Barnes & Thornburg

[57] ABSTRACT

The servo control system that is provided particularly as a power steering system for motor vehicles has two shaft parts that can be rotated with respect to one another against a spring force. An element slides as a function of the relative rotation, said element, in turn, adjusting a control slide of a servo valve arranged with a stationary housing. Correspondingly, a piston of a motor operator is acted upon by different pressures.

11 Claims, 2 Drawing Sheets

SERVO CONTROL SYSTEM, PARTICULARLY A POWER CONTROL SYSTEM FOR MOTOR VEHICLES

BACKGROUND AND SUMMARY OF THE INVENTION

The present invention relates to a servo control system, particularly a power steering system for a motor vehicle.

A servo control system of the above described type which is known from German Published Unexamined Patent Application No. 1,093,224, is a power steering system for a motor vehicle. That system has flange elements that are an axial distance from one another and are arranged at two shaft parts that have the same axis and are rotatable relative to one another. One flange element, in a non-rotatable and axially non-slidable manner, is connected with one shaft part, while the other flange element is held at the other shaft part in a non-rotatable, but axially slidable manner. Spring bars are arranged between the flange elements at a radial distance from the axis of the shaft parts, the ends of these spring bars being fastened at the front sides of the flange elements facing one another. The longitudinal axes of the spring bars are aligned tangentially with respect to a helix enveloping the shaft parts. As soon as a relative rotation occurs between the shaft parts, the spring bars change their slope with respect to the shaft axis, so that the axial distance of the flange elements from one another is changed.

The circumferential edge of the slidable flange element engages into a groove of a control slide of a control valve unit with a stationary housing, this control slide being arranged in parallel to the longitudinal axes of the shaft parts. As a result, the control slide carries out the same stroke as the axially slidable flange element.

When steering is actuated by the turning of the steering wheel, the shaft parts will carry out a relative rotation against the resistance of the spring bars that depends on the steering resistance. These spring bars try to keep the shaft parts in a normal position relative to one another. The sliding of the slidable flange element that is caused by the relative rotation actuates the control side of the servo valve unit so that a motor operator that is controlled by the servo valve unit supports the respective desired steering operation with a force that depends on the extent of the shifting of the control slide.

A power steering system that is similar in principle is described in German Published Examined Patent Application No. 1,166,636. In that system, guide rods that are rigid elements are arranged between a flange element that is arranged at one shaft part in a non-rotatable and axially non-slidable way, and a flange element that is connected with the other shaft part in a non-rotatable, but axially slidable way, the ends of these guide rods in each case being hinged at the flange-type elements. The longitudinal axes of the guide rods, in turn, extend tangentially with respect to a helix enveloping the shaft parts. As a result, during a relative rotation between the shaft parts, the slidable flange element, in turn, is slid in the direction of the axis of the shaft parts. This axial stroke will then be transmitted to the control valve unit of the power steering system.

In the above-described known constructions, the slidable flange element carries out relatively small strokes when the two shafts parts rotate relative to one another. Corresponding to the small strokes of the slidable flange element, the control slide of the control valve unit also carries out relatively small strokes. This has the result that the opening cross-sections of the control valve unit controlled by the control slide must be dimensioned to be relatively small, if the control cross-sections, during the shifting of the control slide, are to change by a larger factor. However, this requires that the fluid system of the servo control system must work with a higher pressure in order to make possible the flow of larger amounts of fluid through the control cross-sections.

It is therefore an objective of the invention to provide a servo control system or a power steering system that, with relatively low constructive expenditures and comparatively small dimensions, makes possible large control strokes and thus large control cross-sections and has low energy requirements.

This and other objectives are achieved in the present invention by providing a servo control system having first shaft means connected to a controlling mechanism and second shaft means connected to control gear, this second shaft means being elastically coupled to the first shaft means. The system includes a motor operator connected to the control gear and which is movable forwards and backwards in response to pressure. A control slide variably connects the pressure source to the motor operator in response to the displacement of the control slide. A displaceable element is arranged on one of the shaft means and is screwably displaceable in response to relative rotation between the first and second shaft means. This displaceable element is operatively connected to the control slide and displaces the control slide in response to the relative rotation between the first and second shaft means.

The present invention is based on the recognition that the axially slidable part, because of its screwably displaceable arrangement on one shaft part, during relative rotations between the shaft parts and the connected axial shifting of the displaceable part, carries out an additional rotating motion which, in turn, causes a change of the axial stroke. In this embodiment, the extent of the axial stroke is increased if the connecting rod or rods are aligned tangentially with respect to a helix enveloping the shaft parts, the slope of this helix being opposed to the slope of the helix reflecting the screwable displaceability.

According to a preferred embodiment of the invention, it is provided that each connecting line going through the joints of the connecting rods, in axial view of the shaft parts, extends tangentially to the shaft axis. In top view, the connecting line extends onto a plane that is parallel with respect to the axis and contains the connecting line. In this plane, the connecting line extends sloped to the axis of the shaft at an angle of about 45°, when the shaft parts, by means of the spring unit, are held in their relative central position, in other words, are not rotated relative to one another to the right or to the left. On the basis of this arrangement, the extent of the axial stroke of the slidable part is determined only by the amount of the relative rotation between the shaft parts, and not by the direction of the relative rotation It is also advantageously provided to arrange at the displaceable element a ring disk or circular disk with an edge that is concentric with respect to the axis of the shaft parts, this edge, in a form-fitting manner, is connected with the control slide or with a part connected with it for the adjustment of the axis direction of the shaft parts, for example, in that the control slide or the part connected with it reaches around the edge of the ring disk or circular disk on both its sides.

Instead, it is also contemplated to provide a ring groove at the displaceable element concentrically to the axis of the shaft parts, this ring groove, in a form-fitting manner, being correspondingly connected with the control slide or with a part connected with it, such that the control slide or the part connected with it engages in the ring groove. Therefore, in both cases, the control slide and the displaceable element are coupled with respect to the drive in a very simple way.

Other objects, advantages and novel features of the present invention will become apparent from the following detailed description of the invention when considered in conjunction with the accompanying drawings

DETAILED DESCRIPTION OF THE DRAWINGS

Figure 1:
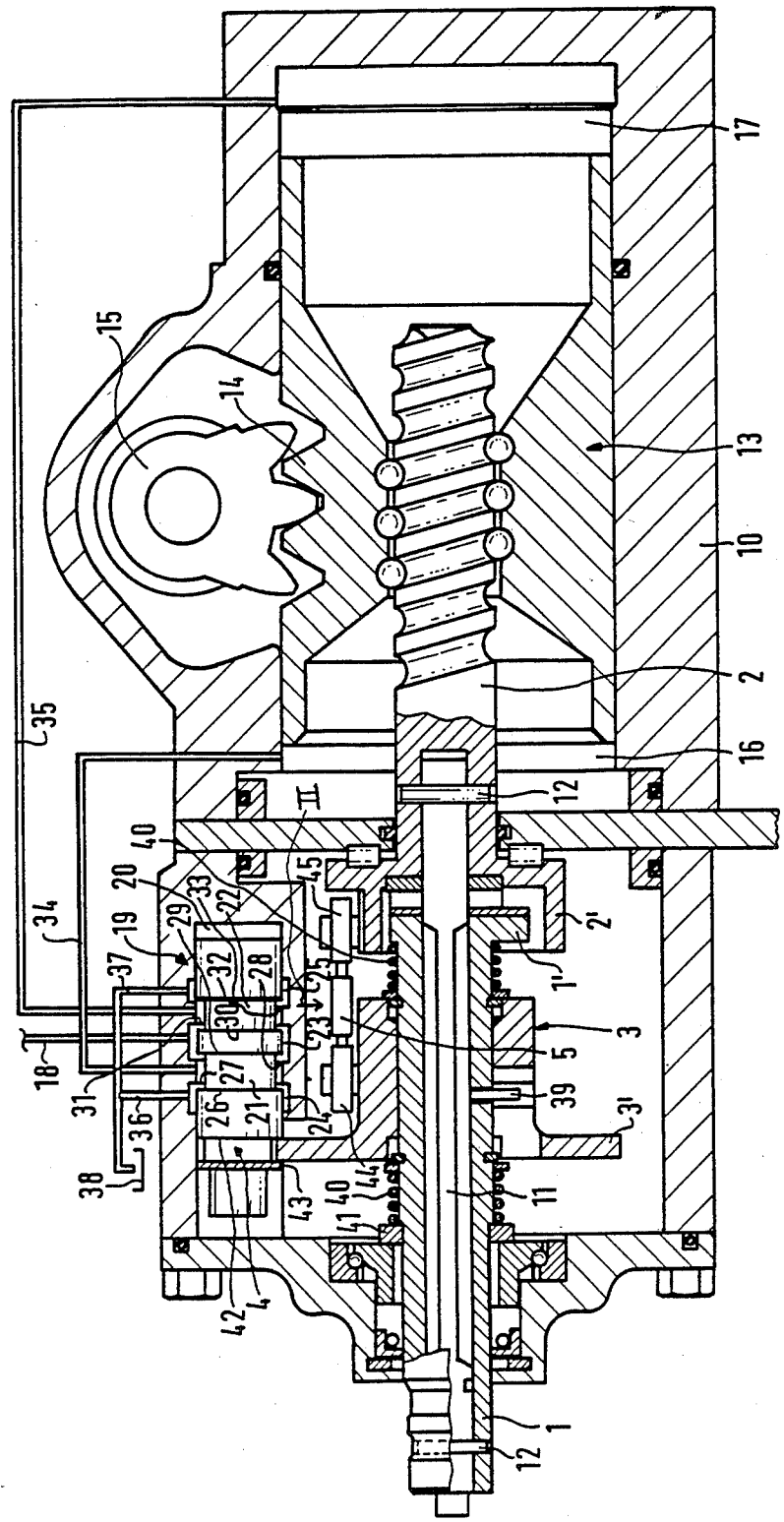
FIG. 1 is a longitudinal sectional view of a power steering system according to a preferred embodiment of the present invention.

The power steering system according to the invention has a housing 10 with two shaft parts 1 and 2 that are pivoted in it. The first shaft part 1 is arranged as an input shaft part and is connected with a steering column or a steering wheel that is not shown. The second shaft part 2 is a steering worm which is torsion-elastically coupled with the input shaft part 1. A torsion-elastic torsion bar 11 is used for this purpose that is housed in an axial bore of the shaft parts 1 and 2, the ends of this torsion bar 11, by means of pins 12, in each case, being connected with the two shaft parts 1 and 2 in a torsionally fixed manner. Correspondingly, the shaft parts 1 and 2 can be rotated relative to one another against the spring force of the torsion bar 11. In this embodiment, the extent of the possible relative rotation is limited by the interaction of the ends 1' and 2' of the shaft parts 1 and 2 facing one another. The end 1' of shaft part 1 has a circumference with a non-circular cross-section, while end 2' of shaft part 2 has an end-face recess with a non-circular cross-section that receives the end 1', this latter cross-section making it possible for the end 1' to have a predetermined movement play in rotating direction relative to shaft part 2.

During the rotation of the second shaft part 2 that forms the steering worm, a piston 13 slides on the second shaft part 2 and is guided so that it can slide in the housing 10. By means of a lateral toothing 14, the piston 13 mates with a tooth segment 15 which itself drives a linkage for the control of the vehicle steered wheels that are not shown.

Inside the housing 10, the piston 13 separates two chambers 16 and 17 from one another that are filled with a hydraulic medium and may be acted upon by different pressures so that the shifting of the piston 13 is supported hydraulically when the steering worm or the second shaft part 2 is set into rotation by the rotation of the input shaft part 1. The piston 13, as well as the chambers 16 and 17, form a motor operator that is housed in the housing 10 and is used for generating a force that supports the drive of the tooth segment 15 in both possible rotating directions. This force rises and falls with the extent of the relative rotation between the shaft parts 1 and 2 with respect to a central position of the shaft parts 1 and 2 relative to one another.

In order to be able to hydraulically act upon the piston 13 in one direction or the other, the chambers 16 and 17 may be connected with the pressure line 18 of a pump that is not shown, i which case the pressures in the chambers 16 and 17 are controlled or changed by a control valve unit 19. The control valve unit 19 has a piston-type control slide 4 that is shifted axially in a manner that is described below as a function of the relative rotation occurring between the shaft parts 1 and 2.

The control slide 4 is slidably arranged in a bore 20 of the housing 10. At the control slide 4 as well as at the bore 20, recesses 21, 22 and 23 to 25 are provided as circumferential grooves. They are arranged such that the first-mentioned recesses 21 and 22 in the control slide 4 are wider in the axial direction of the control slide 4 than the webs remaining between the recesses 23 to 25 of the bore 20. Correspondingly, the ring spaces that are formed by the mentioned recesses are connected with one another by ring openings which themselves are limited by control edges 26 to 33.

The ring spaces that are formed by the recesses 21 and 22, via lines 34 and 35, are connected with one of the chambers 16 and 17 respectively. The ring chamber that is formed by the recess 23 is connected with the pressure line 18. The ring chambers that are formed by the recesses 24 and 25, via lines 36 and 37, are connected with a tank 38 for the hydraulic medium.

In the shown central position of the control slide 4, a hydraulic medium that is supplied via the pressure line 18 into the ring space of the recess 23, passes through between the control edges 28, 29 and 30, 31 into the ring chambers of the recesses 21 and 22. From these recesses 21 and 22, the hydraulic medium, on the one side, enters into the lines 34 and 35 and thus into the chambers 16 and 17. On the other side, the hydraulic medium passes through between the control edges 26, 27 and 32, 33 to reach the ring spaces of the recesses 24 and 25. From there, the hydraulic medium, through the lines 36 and 37, flows back into the tank 38.

In the shown central position of the control slide 4, the same pressure occurs in the chambers 16 and 17 because the ring chambers formed by the recesses 21 and 22 also have the same pressures, since the cross-sections remaining between the control edges 28, 29 and between control edges 30, 31 have the same size as the free cross-sections between the control edges 26, 27 and between edges 32, 33. When the control slide 4 slides to the left, for example, the free gaps between the control edges 28, 29 and between control edges 32, 33, become narrower, whereas the gaps between the control edges 26, 27 and between 30, 31 will become wider. As a result, a different pressure occurs in the chambers formed by the recesses, such that a low pressure is achieved in the area of the recess 21, and a high pressure is achieved in the area of recess 22. This is because the inflow of the hydraulic medium to the recess 21 is throttled while at the same time, the discharge of the hydraulic medium from recess 21 is dethrottled. In recess 22 the inflow of the hydraulic medium is dethrottled and the discharge of the medium is throttled. In the extreme case, the inflow to the recess 21 between the control edges 28 and 29 is blocked completely, while in the recess 22, the inflow is opened up completely and the discharge between the control edges 32 and 33 is closed completely.

The different pressures in the ring chambers formed by the recesses 21 and 22, via the lines 34 and 35, occur also in chambers 16 and 17, so that the piston 13, when the control slide 4 is shifted to the left, is also slid to the left. In this case, the generated regulating power depends on the extent of the shifting of the control slide 4.

If the control slide 4 is slid to the right, a difference of pressure occurs in chambers 16 and 17 in reverse direction, so that the piston 13 will try to slide to the right with a regulating power that again depends on the extent of the shifting of the control slide 4.

A sleeve-type slidable element 3 is used for the shifting of the control slide 4 as a function of the relative rotation between shaft parts 1 and 2, this element 3 being, in a preferred embodiment, non-rotatably, but axially slidably arranged on the input shaft part 1. The non-rotatability is ensured by means of an alignment pin 39 arranged at the shaft part 1, this alignment pin 39 projecting into an axial slot of the slidable element 3 and being able to be supported in a friction-reducing manner with respect to the walls of the slot by means of a roller bearing or the like.

The slidable element 3, by means of springs 40 that are arranged at both its front ends, is forced into a central position. The mentioned springs 40, in each case, support themselves with one end at the slidable element 3, and with the other end, at a circumferential ring step of the shaft part 1 or at a ring disk 41 arranged there.

At the slidable element 3, a circular disk 3' is arranged that, with its circumferential edge, extends to the control slide 4 that somewhat overlaps the disk edge on both front sides of the disk 3'. For this purpose, a ring step 42 at the control slide is used, on the one side of the disk 3', and a ring disk 43 that is fixed by a Seeger circlip ring on the control slide 4 is used on the other side. The ring step 42 and the ring disk 43 overlap the disk 3 somewhat in the manner shown in FIG. 1. Correspondingly, the control slide 4 and the slidable element 3 can be shifted only jointly in the direction of the axis of the shaft parts 1 and 2.

Figure 3:
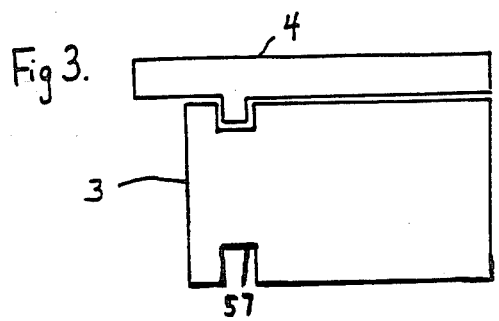
FIG. 3 is a schematic side view of an alternate embodiment of a control slide and slidable element of the present invention.

In the embodiment shown in FIG. 3, the slidable element 3 includes a ring groove 57 into which the control slide 4 engages, such that when slidable element is displaced in an axial direction, the control slide 4 will be similarly axially displaced.

Figure 2:
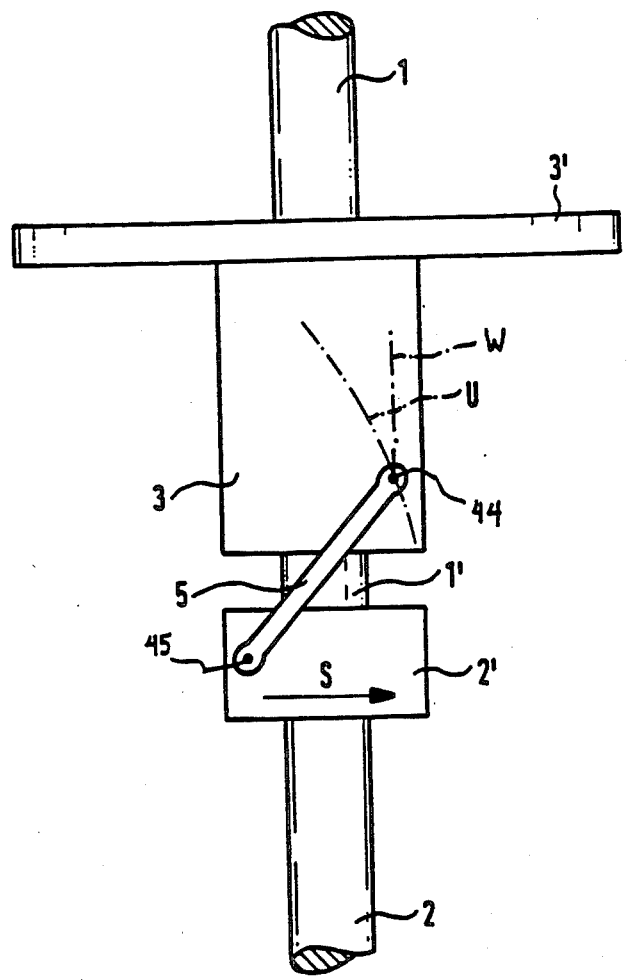
FIG. 2 is a diagrammatic view of the input shaft part as well as of the steering worm corresponding to the Arrow II in FIG. 1.

As shown especially in FIG. 2, the slidable element 3 is coupled with the adjacent end 2' of the shaft part 2 or of the steering worm by a connecting rod 5. By means of joints 44 and 45, this connecting rod 5 is coupled to the slidable element 3 and the end 2'. The longitudinal axis of the connecting rod 5 is sloped relative to the longitudinal axis of the shaft parts 1 and 2 such that the longitudinal axis or the connecting line between the joints 44 and 45 forms a tangent to a helix that concentrically envelopes the longitudinal axis of the shaft parts 1 and 2.

Preferably, the slope of the connecting rod 5 is dimensioned such that the connecting line of the joints 44 and 45 in the view of FIG. 2 together with the longitudinal axis of the shaft parts 1 and 2 forms an angle of about 45°. The arrangement operates in the following way:

When the input shaft part 1 is rotated by the actuating of the steering wheel of the vehicle, the steering worm or the shaft part 2 also rotates in the corresponding rotational direction. However, in this case, a relative rotation occurs between the shaft parts 1 and 2 corresponding to the steering resistance that must be overcome in each instance, during which the torsion rod 11 is elastically twisted. By means of an axial bearing that is arranged between the ends 1' and 2' of the shaft Parts 1 and 2, it i ensured that the shaft parts 1 and 2 maintain their axial distance during relative rotations in an unchanged manner.

In certain preferred embodiments, because of the relative rotation between the shaft parts 1 and 2, the connecting rod 5 will now cause an axial shifting of the slidable element 3 that is non-rotatable relative to shaft part 1. When, for example, the steering worm or the shaft part 2 rotates in the direction of the Arrow S with respect to shaft part 1 in FIG. 2, the slidable element 3 is shifted upwards, such that joint 44 follows path W. In the case of the reversed relative direction, a downward shifting of the element 3 takes place.

In an alternate preferred embodiment, the slidable element is arranged on the shaft part 1 in a screwably displaceable manner. In this embodiment, the helix that extends the helical displacement path has a slope that is opposite to the helix to which the connecting line between the joints 44 and 45 of the connecting rod 5 forms a tangent. An example of a corresponding helical displacement path for joint 44 is shown by a dotted line in FIG. 2 and is marked with the letter U. This curve U also represents the recess in element 3 in which pin 39 travels in this embodiment When the slope of the helical displacement path U is dimensioned correctly, the slope of this helix with respect to the longitudinal axis of shaft 1 should be opposite to the slope of the connecting line between the joints 44 and 45, but have an unequal size, so that the slidable element 3 carries out a particularly large axial stroke during relative rotations between shaft parts 1 and 2.

Although the present invention has been described and illustrated in detail, it is to be clearly understood that the same is by way of illustration and example only, and is not to be taken by way of limitation The spirit and scope of the present invention are to be limited only by the terms of the appended claims.

What is claimed:

1. A servo control system, having a first shaft part connected to an operating side, a second shaft part that is coaxial with said first shaft part and is connected to control gear, a spring unit for elastically coupling said first and second shaft parts, a control slide of a servo valve unit that is arranged in a stationary housing, a gear unit connected between said first and second shaft parts for adjusting said control slide by means of said gear unit, and as a function of an extent of a relative rotation of said first and second shaft parts with respect to one another, being deflected from a central position more or less, and as a function of the rotating direction, into one or the other direction, said control slide connecting a pressure source to a motor operator controlled by said servo valve unit and that with respect to drive is connected with said control gear, said motor operator being movable forwards and backwards in response to an adjusting force that depends on the extent of the deflection of said control slide, said gear unit having an element arranged on one said shaft part and being axially displaceable by said relative rotation of said shaft parts and is drivingly coupled with said control slide, said element that is axially displaceable on one said shaft part being coupled with the other said shaft part by at least one connecting rod means, one end of said connecting rod means being coupled to said axially displaceable element, and another end of said connecting rod means, at a radial distance from a shaft axis, being coupled to the other said shaft part or an element connected to the other said shaft part in a torsionally fixed manner, such that a projection of a connecting line between the couplings of said connecting rod means onto an axial plane of the shaft parts forms an angle with respect to the shaft axis, wherein said displaceable element is screwably displaceable on the one said shaft part, such that the axial stroke of the displaceable element is increased during said relative rotation between said shaft parts.

2. A servo control system according to claim 1, wherein said connecting line in axial view of said shaft parts extends tangentially with respect to said shaft axis, and in top view said connecting line extends onto a plane that is parallel with respect to the axis and contains the connecting line, said connecting line extending sloped at an angle of approximately 45° with respect to the shaft axis.

3. A servo control system according to claim 2, wherein said displaceable element includes a ring disk having an edge that is concentric with respect to the axis of the shaft parts, said edge being connected in a form-fitting manner with at least one of the control slide and a part connected with said control slide for the adjustment of said control slide in the direction of the axis of the shaft parts.

4. A servo control system according to claim 3, wherein at least one of the control slide and the part connected with said control slide reach around the edge of said ring disk on both front sides of said ring disk.

5. A servo control system according to claim 3, wherein at least one of the control slide and the part connected with said control slide reach around the edge of said circular disk on both front sides of said circular disk.

6. A servo control system according to claim 2, wherein said slidable element includes a ring groove arranged concentrically with respect to the axis of said shaft parts, said ring groove being connected in a form-fitting manner with at least one of said control slide and a part connected with said control slide for the adjustment of said control slide in the direction of the axis of the shaft parts.

7. A servo control system according to claim 6, wherein at least one of said control slide and the part connected with said control slide engage in said ring groove.

8. A servo control system according to claim 2, wherein said displaceable element includes a circular disk having an edge that is concentric with respect to the axis of the shaft parts, said edge being connected in a form-fitting manner with at least one of the control slide and a part connected with said control slide for the adjustment of said control slide in the direction of the axis of the shaft parts.

9. A servo control system according to claim 1, wherein said system is a power steering system for motor vehicles, said operating side is a steering wheel side, and said control gear are steering gear.

10. A servo control comprising:
first shaft means connected to a controlling mechanism;
second shaft means connected to control gear and elastically coupled to said first shaft means;
a motor operator connected to said control gear and movable forwards and backwards in response to pressure;
a pressure source for providing fluid pressure;
control slide means for variably connecting said pressure source to said motor operator in response to displacement of said control slide means;
a displaceable element screwably displaceable on one said shaft means in response to the relative rotation between said first and second shaft means, and operatively connected to said control slide means for displacing said control slide means in response to relative rotation between said first and second shaft means; and
connecting means connecting the other said shaft means to said displaceable element, such that relative rotation of one said shaft means to the other said shaft means causes an angle formed by an axis of said connecting means to a longitudinal axis of said first and second shaft means to change, and thereby screwably displace said displaceable element.

11. A servo control mechanism according to claim 10, wherein said displaceable element includes means for causing said displaceable element to follow a screw path displacement.

* * * * *